US006902277B1

(12) United States Patent
Ehrne

(10) Patent No.: US 6,902,277 B1
(45) Date of Patent: Jun. 7, 2005

(54) HOUSING FOR A SPATIAL LIGHT MODULATOR

(75) Inventor: Franklin D. Ehrne, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/752,338

(22) Filed: Jan. 6, 2004

(51) Int. Cl.$^7$ .......................... G03B 21/14; G02F 1/136
(52) U.S. Cl. .............................. 353/119; 349/58
(58) Field of Search ................. 353/101, 119, 353/122; 349/58

(56) References Cited

U.S. PATENT DOCUMENTS

| | | | |
|---|---|---|---|
| 2,403,731 A | 7/1946 | MacNeille .................. 359/488 |
| 4,441,791 A | 4/1984 | Hornbeck | |
| 4,701,028 A | 10/1987 | Clerc et al. | |
| 5,039,185 A | 8/1991 | Uchida et al. ............. 349/119 |
| 5,298,199 A | 3/1994 | Hirose et al. | |
| 5,535,047 A | 7/1996 | Hornbeck | |
| 5,570,213 A | 10/1996 | Ruiz et al. .................. 349/116 |
| 5,576,854 A | 11/1996 | Schmidt et al. | |
| 5,600,383 A | 2/1997 | Hornbeck | |
| 5,620,755 A | 4/1997 | Smith, Jr. et al. | |
| 5,719,695 A | 2/1998 | Heimbuch | |
| 5,743,611 A | 4/1998 | Yamaguchi et al. | |
| 5,798,819 A | 8/1998 | Hattori et al. | |
| 5,808,795 A | 9/1998 | Shimomura et al. | |
| 5,912,762 A | 6/1999 | Li et al. | |
| 5,914,818 A | 6/1999 | Tejada et al. ............... 359/663 |
| 5,918,961 A | 7/1999 | Ueda ............................ 353/20 |
| 5,930,050 A | 7/1999 | Dewald | |
| 5,988,818 A * | 11/1999 | Fujimori et al. ............ 353/119 |
| 6,008,951 A | 12/1999 | Anderson | |
| 6,010,221 A | 1/2000 | Maki et al. | |
| 6,062,694 A | 5/2000 | Oikawa et al. | |
| 6,089,717 A | 7/2000 | Iwai ............................. 353/31 |
| 6,122,103 A | 9/2000 | Perkins et al. | |
| 6,234,634 B1 | 5/2001 | Hansen et al. | |
| 6,243,199 B1 | 6/2001 | Hansen et al. | |
| 6,280,036 B1 | 8/2001 | Suzuki | |
| 6,375,328 B2 | 4/2002 | Hashizume et al. | |
| 6,414,734 B1 | 7/2002 | Shigeta et al. .............. 349/113 |
| 6,447,120 B1 | 9/2002 | Hansen et al. ............... 353/20 |
| 6,460,998 B1 | 10/2002 | Watanabe ..................... 353/20 |
| 6,585,378 B2 | 7/2003 | Kurtz et al. .................. 353/31 |
| 6,733,141 B2 * | 5/2004 | Lee ............................. 353/119 |

* cited by examiner

Primary Examiner—Christopher Mahoney
(74) Attorney, Agent, or Firm—Nelson Adrian Blish

(57) ABSTRACT

A housing (100) for a spatial light modulator (30) includes a first frame (102) for supporting the spatial light modulator (30) in the path of an incident illumination beam. A second frame (104) having an aperture (124) is fitted against the first frame (102) and provides a support element for disposing an optical component such as a compensator (90) proximate the aperture (124). The support element is rotatably adjustable about an axis.

29 Claims, 5 Drawing Sheets

HOUSING FOR A SPATIAL LIGHT MODULATOR

CROSS REFERENCE TO RELATED APPLICATIONS

Reference is made to commonly-assigned copending U.S. patent application Ser. No. 10/040,663, filed Jan. 7, 2002, entitled DISPLAY APPARATUS USING A WIRE GRID POLARIZING BEAMSPLITTER WITH COMPENSATOR, by Xiang-Dong Mi, et al.; U.S. patent application Ser. No. 10/050,309, filed Jan. 16, 2002, entitled PROJECTION APPARATUS USING SPATIAL LIGHT MODULATOR, by Joshua M. Cobb; and U.S. patent application Ser. No. 10/163,228, filed Jun. 5, 2002, entitled PROJECTION DISPLAY USING A WIRE GRID POLARIZATION BEAMSPLITTER WITH COMPENSATOR, by Barry D. Silverstein et al.; the disclosures of which are incorporated herein.

FIELD OF THE INVENTION

This invention generally relates to a digital projection apparatus that uses a liquid crystal device as an area spatial light modulator and more particularly relates to an apparatus and method for achieving improved contrast using an adjustable compensator in the optical path.

BACKGROUND OF THE INVENTION

In order to be considered as suitable replacements for conventional film projectors, digital projection systems must meet demanding requirements for image quality. This is particularly true for cinematic projection systems. In order to provide a competitive alternative to conventional cinematic-quality projectors, digital projection apparatus must meet high standards of performance, providing high resolution, wide color gamut, high brightness, and frame-sequential contrast ratios exceeding 1,000:1.

The most promising solutions for digital cinema projection employ, as image forming devices, one of two types of spatial light modulators. The first type of spatial light modulator is the digital micromirror device (DMD), developed by Texas Instruments, Inc., Dallas, Tex. DMD devices are described in a number of patents, for example U.S. Pat. Nos. 4,441,791; 5,535,047; 5,600,383 (all to Hornbeck); and U.S. Pat. No. 5,719,695 (Heimbuch). Optical designs for projection apparatus employing DMDs are disclosed in U.S. Patent No. 5,914,818 (Tejada et al.); U.S. Pat. No. 5,930,050 (Dewald); U.S. Pat. No. 6,008,951(Anderson); and U.S. Pat. No. 6,089,717 (Iwai). DMD-based projectors demonstrate some capability to provide the necessary light throughput, contrast ratio, and color gamut, however, inherent resolution limitations (with current devices providing only 1024×768 pixels) and high component and system costs have restricted DMD acceptability for high-quality digital cinema projection.

The second type of spatial light modulator used for digital projection is the liquid crystal device (LCD). The LCD forms an image as an array of pixels by selectively modulating the polarization state of incident light for each corresponding pixel. LCDs appear to have advantages as spatial light modulators for high-quality digital cinema projection systems. Among examples of electronic projection apparatus that utilize LCD spatial light modulators are those disclosed in U.S. Pat. No. 5,808,795 (Shimomura et al.); U.S. Pat. No. 5,798,819 (Hattori et al.); U.S. Pat. No. 5,918,961 (Ueda); U.S. Pat. No. 6,010,221 (Maki et al.); and U.S. Pat. No. 6,062,694 (Oikawa et al.). Recently, Eastman Kodak Company and JVC demonstrated a LCD-based projector capable of high-resolution (2,000×1,280 pixels), high frame sequential contrast (in excess of 1,000:1), and high light throughput (up to 12,000 lumens). This system utilizes three vertically aligned LCDs (one per color) driven via silicon backplane electronics.

JVC and others have developed vertically aligned LCDs, which are addressed via a silicon backplane. The JVC LCD devices are described, in part, in U.S. Pat. No. 5,570,213 (Ruiz et al.) and U.S. Pat. No. 5,620,755 (Smith, Jr. et al.). In contrast to early twisted nematic or cholesteric LCDs, vertically aligned LCDs promise to provide much higher modulation contrast ratios (in excess of 2,000:1). It is instructive to note that, in order to obtain on-screen frame sequential contrast of 1,000:1 or better, the entire system must produce greater than 1,000:1 contrast, and both the LCDs and any necessary internal polarization optics must each separately provide ~2,000:1 contrast. Among considerations for contrast are variables such as spectral bandwidth and angular width of incident light, expressed as an f/# value. Contrast tends to decrease as spectral bandwidth increases and as the f/# decreases. Modulation contrast of LCD components is also reduced by residual de-polarization or misoriented polarization, such as by thermally induced stress birefringence.

Thus, as is known to those skilled in the digital projection art, the optical performance provided by LCD based electronic projection system is, in large part, defined by the characteristics of the LCDs themselves and by the polarization optics that support LCD projection. The performance of polarization separation optics, such as polarization beamsplitters, pre-polarizers, and polarizer/analyzer components, is of particular importance for obtaining high contrast ratios.

The most common conventional polarization beamsplitter solution, which is used in many projection systems, is the traditional MacNeille prism, disclosed in U.S. Pat. No. 2,403,731. This device has been shown to provide a good extinction ratio (on the order of 300:1). However, this standard prism operates well only with incident light over a limited range of angles (a few degrees), and in operation it can experience fabrication or thermally induced stress, which is realized as stress birefringence and loss of image contrast.

Recognizing some of the problems inherent to MacNeille prism use, alternative polarization beamsplitter technologies have been proposed to meet the needs of an LCD based digital cinema projection system. For example, the beamsplitter disclosed in U.S. Pat. No. 5,912,762 (Li et al.) comprises a plurality of thin film layers sandwiched between two dove prisms and attempts to achieve high extinction ratios for both polarization states. Other projector designs have employed liquid-immersion polarization beamsplitters. However, neither of these alternate solutions is ideal, as these designs are affected by fabrication issues, performance limits, and cost concerns.

Wire grid polarizers have been in existence for a number of years, and were initially used in radio-frequency applications and in optical applications using non-visible light sources. Until recently, use of wire grid polarizers with light in the visible spectrum has been limited, largely due to constraints of device performance or manufacture. However, as is disclosed in U.S. Pat. No. 6,122,103 (Perkins et al.), higher quality wire grid polarizers and beamsplitters have now been developed for broadband use in the visible spectrum. Among these are new devices commercially available from Moxtek Inc. of Orem, Utah. While existing wire grid polarizers, including the devices described in U.S. Pat. No. 6,122,103, may not exhibit all of the necessary performance characteristics needed for obtaining the high contrast required for digital cinema projection, these devices do have a number of advantages. When compared against standard polarizers, wire grid polarization devices exhibit relatively high extinction ratios and high efficiency. Additionally, the contrast performance of these wire grid devices also has broader angular acceptance (NA or numerical aperture) and more robust thermal performance (with less opportunity for thermally induced stress birefringence) than standard polarization devices. Furthermore, the wire grid polarizers are robust relative to harsh environmental conditions, such as light intensity, temperature, and vibration. These devices perform well under conditions of different color channels, with the exception that response within the blue light channel may require additional compensation.

Wire grid polarizing beamsplitter (PBS) devices have been employed in some digital projection apparatus, with some degree of success. For example, U.S. Pat. No. 6,243,199 (Hansen et al.) discloses use of a broadband wire grid polarizing beamsplitter for projection display applications. U.S. Pat. Nos. 6,234,634 and 6,447,120 (both to Hansen et al.) disclose a wire grid polarizing beamsplitter that functions as both polarizer and analyzer in a digital image projection system. U.S. Pat. No. 6,234,634 states that very low effective f/#s can be achieved using wire grid PBS, with some loss of contrast, however. Notably, neither U.S. Pat. No. 6,234,634 nor U.S. Pat. No. 6,447,120 makes mention of the use of a polarization compensator for correction of light leakage. However, U.S. Pat. No. 6,585,378 (Kurtz et al.), which is assigned to the same assignee as the present invention, discloses an optical system employing both wire grid polarizers and LCDs, which is further complemented by a polarization compensator.

Of particular interest and relevance for the apparatus and methods of the present invention, it must be emphasized that neither the wire grid polarizer, nor the wire grid polarization beamsplitter, provide the target polarization extinction ratio performance (nominally >2,000:1) needed to achieve the desired projection system frame sequential contrast of 1,000:1 or better. Individually, both of these components provide less than 1,000:1 contrast under best conditions. Performance falls off further in the blue spectrum. Finally, the problems of designing an optimized configuration of polarization optics, including wire grid polarizers, in combination with the LCDs, color optics, and projection lens, have not been addressed either for electronic projection in general, or for digital cinema projection in particular.

There have been a number of conventional methods proposed for increasing contrast and eliminating birefringence effects when using LCDs. For example, conventional methods include use of a separate polarizer/analyzer combination with the LCD, sometimes with an additional compensator as in U.S. Pat. No. 5,298,199 (Hirose et al.) which discloses use of a biaxial film compensator for optical birefringence of the LCD. Similarly, U.S. Pat. No. 4,701,028 (Clerc et al.) discloses birefringence compensation built into the structure of the LCD itself. U.S. Pat. No. 5,039,185 (Uchida et al.) discloses a homeotropic LCD with compensator provided between a polarizer/analyzer pair. For projector apparatus using an LCD with the conventional Mac-Neille prism type polarization beamsplitter, a ¼ waveplate used as a compensator has been disclosed, as in U.S. Pat. No. 5,576,854 (Schmidt et al.), which also discloses use of additional phase retardation as compensation for inherent LCD birefringent effects.

Without compensation, the polarization beamsplitter provides acceptable contrast when incident light is within a low numerical aperture. However, in order to achieve high brightness levels, it is most advantages for an optical system to have a high numerical aperture, so that it is able to gather incident light at larger oblique angles. The conflicting goals of maintaining high brightness and high contrast ratio present a significant design problem for polarization components. Light leakage in the OFF state must be minimal in order to achieve high contrast levels. Yet, light leakage is most pronounced for incident light at the oblique angles required for achieving high brightness.

Compensator requirements for wire grid polarizing beamsplitter devices differ significantly from more conventional use of compensators with polarizing beamsplitter devices based on the MacNeille prism design as was noted in reference to U.S. Pat. No. 5,576,854. For example, performance results indicate that the use of a ¼ waveplate, a conventional approach when using the MacNeille prism, is not a suitable solution and can even degrade contrast ratio when used in combination with a wire grid polarizing beamsplitter.

A number of problems must be solved when using compensator components in a digital cinema projection system that employs LCD spatial light modulators with wire grid polarization components. The need for compact packaging of optical components in a digital projection apparatus introduces space constraints that can limit the number of options available for positioning a compensator. This physical constraint is made even more demanding for optical systems that use a low f/#. As has been noted hereinabove, low f/# systems are advantaged for achieving higher overall luminance. It is also desirable to allow some degree of adjustability for compensator components in a digital projector design. Allowing adjustability, however, tends to make packaging requirements even more complex. As another consideration, there is also a need to protect the LCD and other components from ambient dust and dirt, which would degrade image quality and overall device performance.

Prior art solutions for mounting an LCD with its associated polarization and compensator components provide some useful results, but fall somewhat short of the mark in handling the above-mentioned problems. For example:

U.S. Pat. No. 5,576,854 (Schmidt et al.) discloses an adjustable compensator plate disposed between a polarization plate and a liquid crystal light valve to compensate for polarization irregularities in the cone of light projected onto the LCD modulator;

U.S. Pat. No. 6,460,998 (Watanabe) discloses a polarizer having an angle adjustment mechanism in which a first frame arranged in the vicinity of an electrooptic device pivotally supports a second frame having a polarizer thereon, allowing a slight adjustment of the polarizer about a pivot point, where the pivot point is optically off-axis;

U.S. Pat. No. 6,280,036 (Suzuki) discloses a dust preventive structure for spatial light modulator components within a digital projection apparatus, with a field lens attached to each LCD device;

U.S. Pat. No. 5,743,611 (Yamaguchi et al.) discloses dust protection by hermetically sealed components about an LCD;

U.S. Pat. No. 6,375,328 (Hashizume et al.) discloses transparent cover plates bonded to the surface of LCD spatial light modulators; and U.S. Pat. No. 6,414,734 (Shigeta et al.) discloses a sealed unit that houses an LCD with support components.

Significantly, each of the above solutions fails to meet one or more important requirements for compactness and suitability for a low f/# system, precision adjustability of compensator retardance, and protection of the LCD from dust and dirt contamination. Thus, none of these solutions is ideally suited for mounting a compact adjustable compensator for a low f/# optical system in an electronic projection apparatus that comprises an LCD with a wire grid polarization beamsplitter. For example, the solution of U.S. Pat. No. 5,576,854, while it provides adjustability, is not suitable for a system using low f/# optics and does not provide dust protection. The solution of U.S. Pat. No. 6,460,998 is intended only to provide a very limited adjustability of a polarizer component (not a compensator) over a few degrees, where this component is pivoted in an off-axis manner. This solution could be used in a low f/# system; however, there is no consideration for dust protection noted in U.S. Pat. No. 6,460,998. U.S. Pat. No. 6,280,036 provides only a lens and seal against the surface of an LCD, with no accommodation for an adjustable compensator. Similarly, U.S. Pat. Nos. 5,743,611 and 6,375,328 provide dust protection for the LCD, but with no adjustability for polarization or compensator components. U.S. Pat. No. 6,414,734 provides a possible method for sealing any number of support components with an LCD, which could be useful in a low f/# system and is relatively dust-free, but does not provide any adjustability of components.

In conventional LCD component packaging, the liquid crystal light modulator itself is provided within a frame and protected by a glass cover plate. As is well known in the optical arts, a cover plate is detrimental to the optical path, often compromising optical performance. Depending on the application, a glass plate in the optical path introduces the potential for various undesirable optical effects, aberrations, and unwanted reflection or refraction of incident or stray light. However, some type of protection from dust and dirt must be provided to the LCD, even with the potential disadvantages of a glass cover plate.

Thus, it can be seen that there is a need for a mounting arrangement of a controllably adjustable compensator for an LCD spatial light modulator, where this mounting arrangement is suitable for a low f/# optics system and also provides protection from dust and dirt with a minimum number of components.

SUMMARY OF THE INVENTION

It is an object of the present invention to provide a mounting arrangement of an adjustable compensator component with a spatial light modulator. With this object in mind, the present invention provides a housing for a spatial light modulator, wherein the spatial light modulator provides a modulated image beam. The housing comprises:

(a) a first frame for supporting the spatial light modulator in the path of an incident illumination beam;
(b) a second frame, fitted against the first frame, the second frame comprising:
  (i) an aperture for the modulated image beam from the spatial light modulator; and
  (ii) a support element for disposing an optical component proximate the aperture, the support element rotatably adjustable about an axis.

It is a feature of the present invention that it provides a single housing for a spatial light modulator in a color path, with a built-in compensator component.

It is an advantage of the present invention that it provides a compact package suitable for use where space is limited.

It is a further advantage of the apparatus and method of the present invention that it eliminates the need for a cover glass to protect the LCD spatial light modulator from dust and dirt, thereby eliminating a component that compromises image quality.

It is a further advantage of the apparatus and method of the present invention that it provides a mounting method that is suitable in a low f/# optical system.

It is yet a further advantage of the present invention that it provides a solution for protecting an LCD against ambient dust and dirt.

It is yet a further advantage of the present invention that it allows the compensator angle to be controllably adjusted in place, while maintaining alignment to the optical path.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
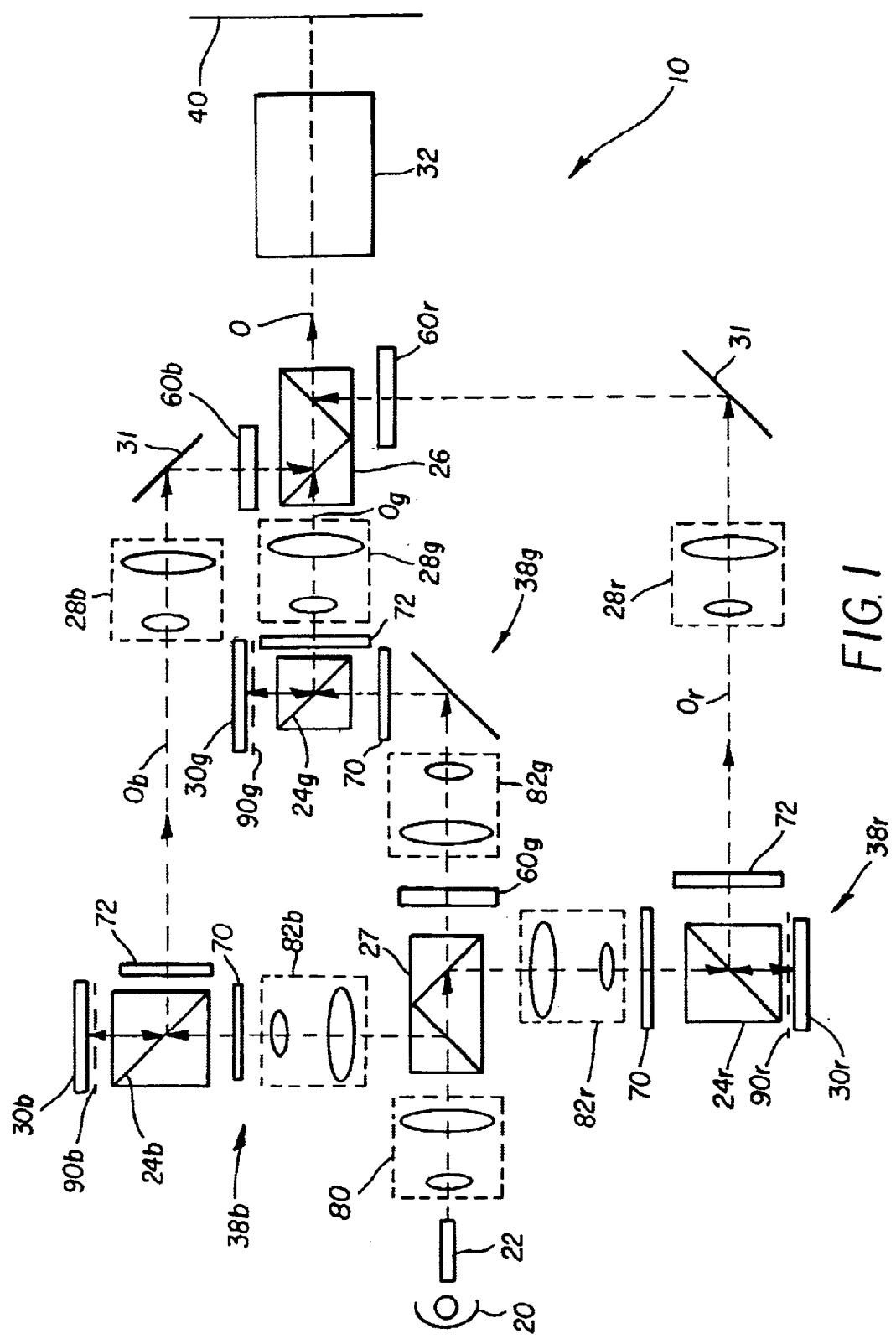
FIG. 1 is a block diagram of a digital cinema projector using three spatial light modulators.

Referring to FIG. 1, there is shown a simplified schematic for a digital motion picture projection apparatus 10 using LCD components. Each color channel (r=Red, g=Green, b=Blue) uses similar components for forming a modulated light beam. Individual components within each path are labeled with an appended r, g, or b, appropriately. For the description that follows, distinctions between color channels are specified when necessary. A light source 20 provides unmodulated light, which is conditioned by uniformizing optics 22 to provide a uniform illumination, directed through an illumination relay lens 80 to a dichroic separator 27. Dichroic separator 27 splits the white light into red, green, and blue color channels. Following any of the three color channels, light goes to a light modulation assembly 38r, 38g, 38b in which a relay lens 82r, 82g, 82b directs light through a prepolarizer 70 to a polarizing beamsplitter 24r, 24g, 24b. Light having the desired polarization state is transmitted through polarizing beamsplitter 24r, 24g, 24b and is then modulated by a spatial light modulator 30r, 30g, 30b, which selectively modulates the polarization state of the incident light over an array of pixel sites. The action of spatial light modulator 30r, 30g, 30b forms an image. The modulated light from this image, reflected from polarizing beamsplitter 24r, 24g, 24b, is transmitted along an optical axis $O_r$, $O_g$, $O_b$, through an analyzer 72 and is directed by a magnifying relay lens 28r, 28g, 28b through an optional folding mirror 31 to a dichroic combiner 26, typically an X-cube, Philips prism, or combination of dichroic surfaces in conventional systems. An optional color-selective polarization filter 60r, 60g, 60b may also be provided in the modulated light path of light modulation assembly 38r, 38g, 38b. Dichroic combiner 26 combines the red, green, and blue modulated images from separate optical axes $O_r$, $O_g$, $O_b$ to form a combined, multicolor image for a projection lens 32 along a common optical axis 0 for projection onto a display surface 40, such as a projection screen.

The reflective liquid crystal device (LCD) of FIG. 1 is a type of spatial light modulator that is widely used in digital projector design. This device accepts polarized light and modulates the polarization of the incident light to provide colored light beam as output. For obtaining polarized light, a polarizing beamsplitter prism, such as a McNeille prism, or a wire grid polarizing beamsplitter is typically employed along with the support of one or more polarizing elements, configured as polarizers and analyzers. Alternately, a transmissive type of LCD could be employed in one or more light modulation assemblies 38r, 38g, or 38b, with a suitable reconfiguration of supporting polarization components, as is well known in the imaging arts.

For providing a corrective amount of retardance in the optical path for modulated light, a compensator 90r, 90g, 90b is used, positioned in the optical path between the LCD spatial light modulator 30r, 30g, 30b and its corresponding polarizing beamsplitter 24r, 24g, 24b. FIG. 1 shows the position of each of optional compensators 90r, 90g, 90b as a dotted line in each respective optical path. As FIG. 1 suggests, spacing constraint is a key consideration when adding a compensator for one or more color light modulation assemblies 38r, 38g, or 38b. For example, it is advantageous that each color light modulation assembly 38r, 38g, 38b have the same optical path length. Any increase to this distance in one color light path would require similar increases in the other light paths. Additionally, although not visible in the schematic view of FIG. 1, there are tight constraints on relative component placement within each color light modulation assembly 38r, 38g, 38b, particularly since each color path uses low f/# optics for maximum brightness. The requirement for adjustability of the compensator further complicates the space problem.

Figure 2:
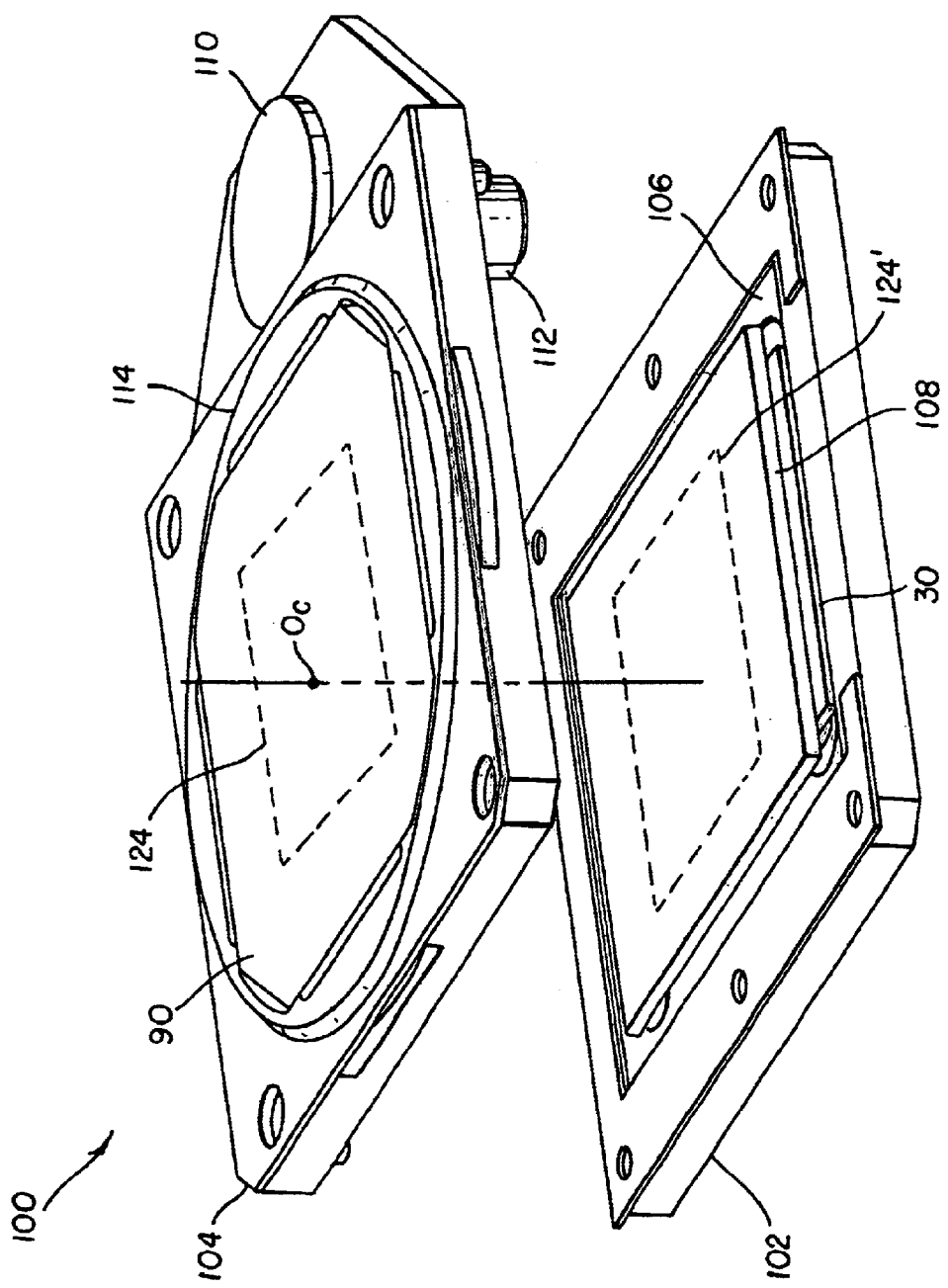
FIG. 2 is an exploded perspective view showing a first housing supporting a spatial light modulator and a second housing that fits against the first housing, supporting an adjustable compensator.

Referring to FIG. 2, there is shown a partial exploded view of a housing 100 for LCD spatial light modulator 30 and a compensator 90 in a preferred embodiment of the present invention. Housing 100 has two major subassemblies, a first frame 102 and a second frame 104. First frame 102 holds spatial light modulator 30 with a counter electrode glass 108 in a nest 106. Second frame 104 holds compensator 90 within a ring 114 over an aperture 124 (shown in phantom in FIG. 2). Compensator 90 is shown as 8-sided, but could be round, square, or any other suitable shape. Compensator 90, for example, may comprise a series of oriented birefringent polymer sheet materials mounted to a glass substrate. Compensator 90 may also comprise a birefringent dielectric optical coating, or an anisotropic form birefringent optical structure, fabricated on a glass substrate. In the embodiment of FIG. 2, compensator 90 does not come in contact with edges of ring 114 or second frame 104, thereby allowing for thermal expansion of compensator 90 without constraint. A pinion gear 110 on second frame 104 cooperates with gear teeth on ring 114 to allow adjustable rotation of compensator 90 about optical axis $O_c$ and always parallel to the spatial light modulator 30. Pinion gear 110 allows adjustment using a slot 112 or other coupling mechanism. Alternately, pinion gear 110 could be part of an external removable alignment fixture.

With reference to FIG. 2, it is instructive to note that in conventional LCD packaging, as was noted in the background section above, a glass cover plate for dust protection is placed atop counter electrode glass 108. Advantageously, the arrangement of FIG. 2, with compensator 90 affixed to ring 114, using a flexible type RTV, seated in recess against second frame 104, provides protection from dust and dirt and thus eliminates the need for a glass cover plate. It is also noteworthy to observe that first frame 102 should be thermally compatible with characteristics of the substrate of spatial light modulator 30, which is typically a silicon substrate. Ideally, the material used for first frame 102 should be rigid and should have a coefficient of thermal expansion (CTE) that is closely identical to the CTE of the substrate of spatial light modulator 30.

Figure 3:
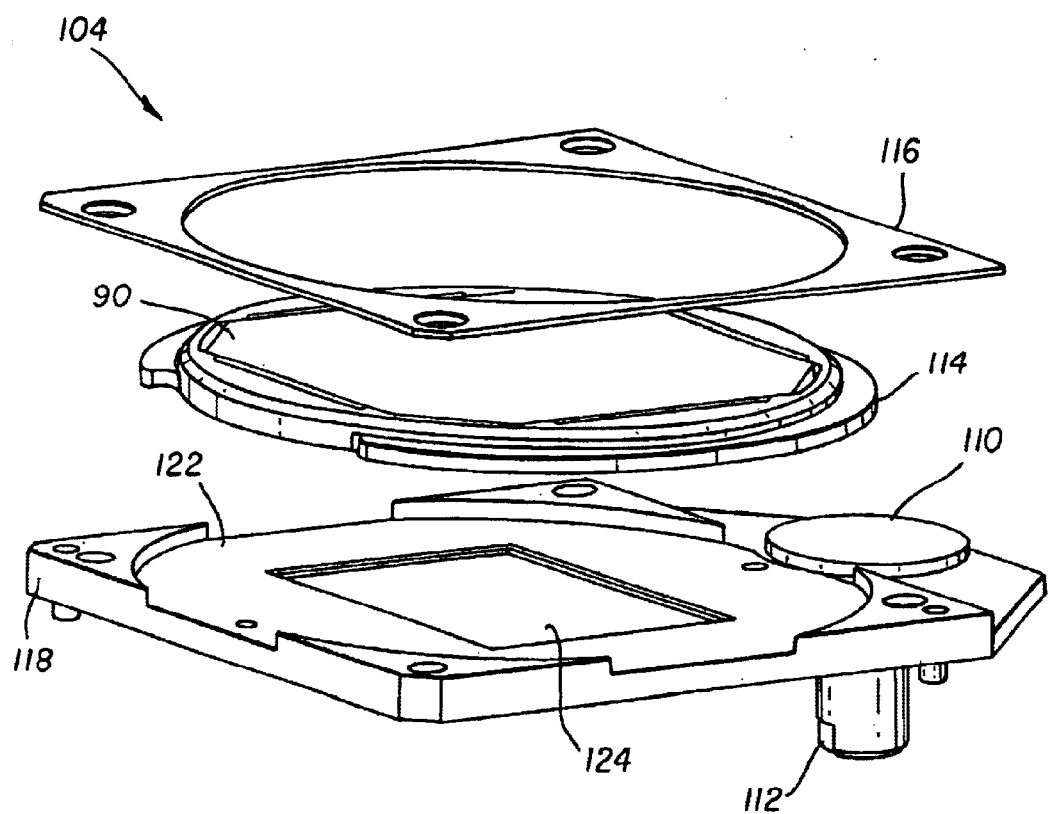
FIG. 3 is an exploded perspective view showing components of the second housing that supports the adjustable compensator.

Referring to FIG. 3, there is shown an exploded view of components of second frame 104. Compensator 90 is seated within ring 114 that provides gear teeth (not shown) that engage pinion gear 110 for rotation. A retainer plate 116, stainless steel in a preferred embodiment, secured by adhesive or mechanical fasteners (not shown) holds ring 114 movably in place in a recess 122 against an aperture plate 118.

Figure 4:
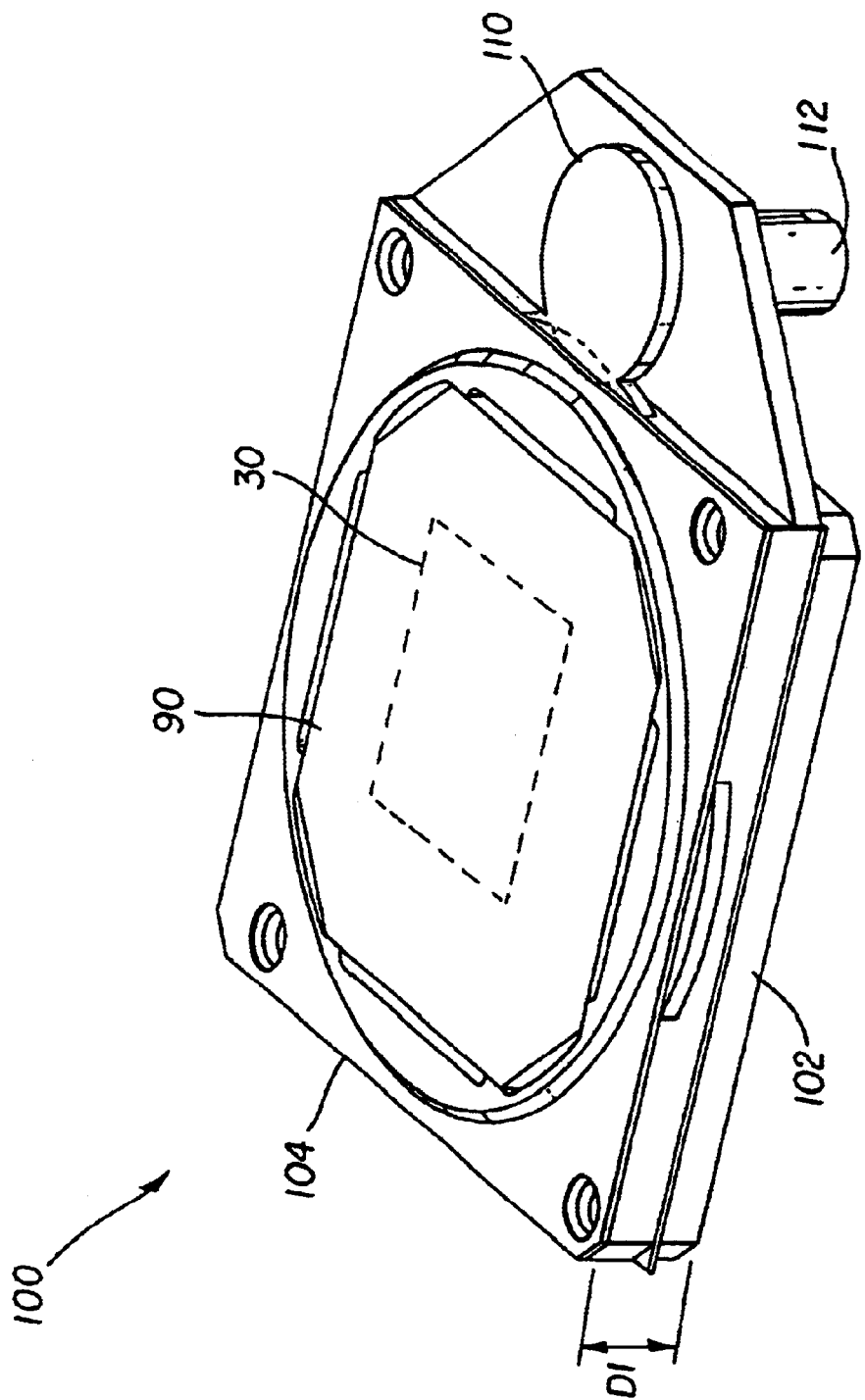
FIG. 4 is a perspective view showing an assembled mounting according to the present invention.

Referring to FIG. 4, there is shown housing 100 as assembled, with second frame 104 mounted on first frame 102. It can be seen that housing 100 provides a relatively thin package containing both spatial light modulator 30 and its corresponding compensator 90, adjustable by accessing slot 112. Pinion gear 110 and ring 114 allow rotation of compensator 90 over a wide range of angles, while centered about optical axis $O_c$ as was shown in FIG. 2. It is intended that compensator 90 experience rotation in a plane nominally parallel to the plane of the modulator 30. In a preferred embodiment, on-axis rotation of 270 degrees or greater is available using the pinion gear 110/ring 114 arrangement. In actual use, compensator 90 is rotated a suitable amount (perhaps only a few degrees) to a nominal fixed position where the image contrast is optimized, for example to maximum contrast or for maximum average contrast as seen across the projected image. Significantly, the arrangement of pinion gear 110 and ring 114 enables adjustment of compensator 90 rotation, but does not add to the depth dimension D1 of housing 100. Optional gasketing components (not shown) used in coupling second frame 104 to first frame 102 allow the surface of spatial light modulator 30 to be sealed more effectively from damage, dust, and dirt.

As FIGS. 2, 3, and 4 show, housing 100 adds an adjustable compensator 90 to the basic package for LCD spatial light modulator 30 and eliminates the need for a glass cover plate. In an actual embodiment, the configuration of housing 100 shown in FIGS. 2, 3, and 4, although it adds adjustable compensator 90, actually reduces the depth D1 of the support package for spatial light modulator 30 by more than 0.080 inches over a conventional frame that is commercially used, maintaining the same level of dust protection.

Figure 5:
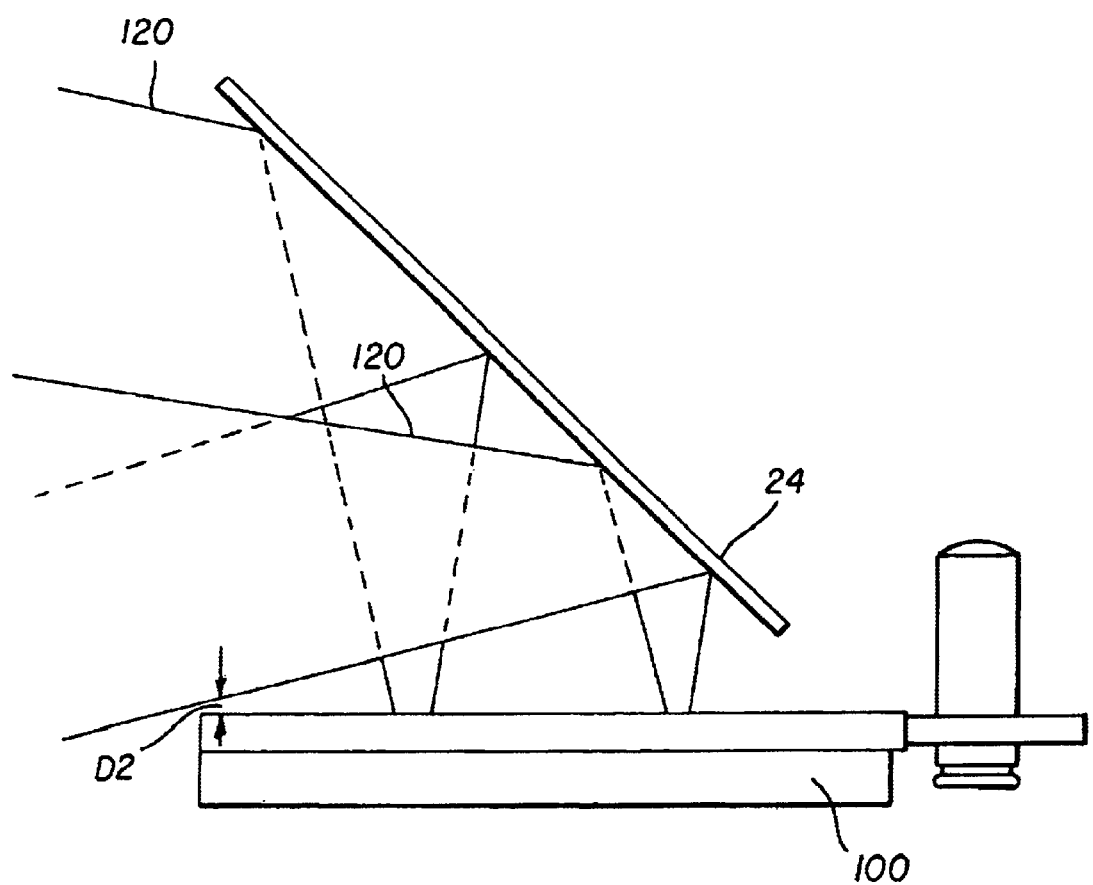
FIG. 5 is a side view showing output light cones emitted from the spatial light modulator mounting according to the present invention.

Referring to FIG. 5, there is shown, from a side view, representative light cones 120 directed toward housing 100 from beamsplitter 24 in a preferred embodiment in which a reflective type of LCD spatial light modulator 30 is used. The small distance D2 allowed between the extreme edge of light cones 120 and housing 100 is minimal in designs using a low f/#. As FIG. 5 shows, the use of housing 100 allows the low f/# design of projection apparatus 10 to be maintained, even where there are considerable space restraints while still allowing for sufficient six axis adjustment of housing 100.

In addition to providing an adjustable compensator 30 component in a compact package, the apparatus of the present invention also maintains protection of the LCD surface from dust and dirt, without a cover plate. The present invention allows a straightforward adjustment procedure for obtaining a suitable alignment of compensator 90 in the optical path, using adjustment procedures well known in the optical calibration arts. Using the component arrangement of FIG. 1, for example, compensator 90r, 90g, 90b within each color light modulation assembly 38r, 38g, 38b can be individually tuned to obtain suitable retardance in the color path.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, any number of alternative adjustment components could be employed for rotation of compensator 90. While the preferred embodiment mounts compensator 90 as the adjustable component within housing 100, other types of optical components, such as a filter or polarizer, could be mounted in the same manner. There are many possible arrangements for cover frame 104, providing the needed aperture 124 and the support structure proximate aperture 124 for rotatably adjustable compensator 90 or other component.

The configuration described with reference to FIGS. 1–5 is directed to a preferred embodiment, in which spatial light modulator 30 is a reflective LCD or another type of reflective polarization modulator. However, housing 100 of the present invention could also be used in an imaging apparatus that uses a transmissive LCD. With reference to FIG. 2, a second aperture 124' (shown in phantom in FIG. 2) would allow incident illumination through spatial light modulator 30 in a transmissive embodiment. The design of housing 100 can also be modified to provide a small tilt or wedge angle between the compensator 90 and the modulator 30. While these two elements are nominally located in parallel planes, a tilt angle between them can reduce any optical interference effects between the components which would effect frame sequential and ANSI contrast. As tilt of the compensator 90 relative to the modulator 30 can make the polarization compensation non-uniform with angle, use of tilt has to be undertaken with care.

Thus, what is provided is an apparatus and method for mounting an adjustable compensator or other component in the optical path of an LCD spatial light modulator, providing an arrangement of components that is especially well suited to a system using low f/# optics, that protects the LCD surface from dust and dirt, and that allows easy adjustment while employing a small number of parts.

Parts List 10 projection apparatus
20 light source
22 uniformizing optics
24 polarizing beamsplitter
24r polarizing beamsplitter, red
24g polarizing beamsplitter, green
24b polarizing beamsplitter, blue
26 dichroic combiner
27 dichroic separator
28r magnifying relay lens, red
28g magnifying relay lens, green
28b magnifying relay lens, blue
30 spatial light modulator
30r spatial light modulator, red
30g spatial light modulator, green
30b spatial light modulator, blue
31 folding mirror
32 projection lens
38r light modulation assembly, red
38g light modulation assembly, green
38b light modulation assembly, blue
40 display surface
60r color-selective polarization filter, red
60g color-selective polarization filter, green
60b color-selective polarization filter, blue
70 prepolarizer
72 analyzer
80 illumination relay lens
82r relay lens, red
82g relay lens, green
82b relay lens, blue
90 compensator
90r compensator, red
90g compensator, green.
90b compensator, blue
100 housing
102 first frame
104 second frame
106 nest
108 counter electrode glass
110 pinion gear
112 slot
114 ring
116 retainer plate
118 aperture plate
120 light cone
122 recess
124 aperture
124' aperture

What is claimed is:

1. A housing for a spatial light modulator, wherein the spatial light modulator provides a modulated image beam, the housing comprising:
    (a) a first frame for supporting the spatial light modulator in a path of an incident illumination beam;
    (b) a second frame, fitted against said first frame, said second frame comprising:
        (i) an aperture for said modulated image beam from said spatial light modulator,
        (ii) a support element for disposing an optical component proximate said aperture, said support element rotatable adjustable about an axis such that said optical component rotates in a plane nominally parallel to a plane of said spatial light modulator; and
    wherein said support element comprises a pinion gear.

2. A housing for a spatial light modulator according to claim 1 wherein said spatial light modulator is a transmissive LCD.

3. A housing for a spatial light modulator according to claim 1 wherein said spatial light modulator is a reflective LCD.

4. A housing for a spatial light modulator according to claim 1 wherein said optical component is a compensator.

5. A housing for a spatial light modulator according to claim 1 wherein said optical component is a polarizer.

6. A housing for a spatial light modulator according to claim 1 wherein said optical component is a filter.

7. A housing for a spatial light modulator according to claim 1 wherein said support element is rotatably adjustable about an optical axis.

8. A housing for a spatial light modulator according to claim 1 wherein said first frame further comprises a second aperture for said incident illumination beam.

9. A housing for a spatial light modulator, wherein the spatial light modulator provides a modulated image beam, the housing comprising:
   (a) a first frame for supporting the spatial light modulator in a path of an incident illumination beam;
   (b) a second frame, fitted against said first frame, said second frame comprising:
      (i) an aperture for said modulated image beam from said spatial light modulator;
      (ii) a support element for disposing an optical component proximate said aperture, said support element rotatably adjustable about an axis such that said optical component rotates in a plane nominally parallel to a plane of said spatial light modulator; and
   wherein said support element comprises a ring having gear teeth.

10. A housing for a spatial light modulator, wherein the spatial light modulator provides a modulated image beam, the housing comprising:
   (a) a first frame for supporting the spatial light modulator in a path of an incident illumination beam;
   (b) a second frame, fitted against said first frame, said second frame comprising:
      (i) an aperture for said modulated image beam from said spatial light modulator;
      (ii) a support element for disposing an optical component proximate said aperture, said support element rotatable adjustable about an axis such that said optical component rotates in a plane nominally parallel to a plane of said spatial light modulator; and
   wherein said support element is rotatably adjustable by more than 90 degrees.

11. A housing for a spatial light modulator, wherein the spatial light modulator provides a modulated image beam, the housing comprising:
   (a) a first frame for supporting the spatial light modulator in a path of an incident illumination beam;
   (b) a second frame, fitted against said first frame, said second frame comprising:
      (i) an aperture for said incident illumination beam to said spatial light modulator and for said modulated image beam from said spatial light modulator;
      (ii) a support element for disposing an optical component proximate said aperture, said support element rotatably adjustable about an axis such that said optical component rotates in a plane nominally parallel to a plane of said spatial light modulator; and
   wherein said support element comprises a pinion gear.

12. A housing for a spatial light modulator according to claim 11 wherein said spatial light modulator is an LCD.

13. A housing for a spatial light modulator according to claim 11 wherein said optical component is a compensator.

14. A housing for a spatial light modulator according to claim 11 wherein said optical component is a polarizer.

15. A housing for a spatial light modulator according to claim 11 wherein said optical component is a filter.

16. A housing for a spatial light modulator according to claim 11 wherein said support element is rotatably adjustable about an optical axis.

17. A housing for a spatial light modulator, wherein the spatial light modulator provides a modulated image beam, the housing comprising:
   (a) a first frame for supporting the spatial light modulator in a path of an incident illumination beam;
   (b) a second frame, fitted against said first frame, said second frame comprising:
      (i) an aperture for said incident illumination beam to said spatial light modulator and for said modulated image beam from said spatial light modulator;
      (ii) a support element for disposing an optical component proximate said aperture, said support element rotatable adjustable about an axis such that said optical component rotates in a plane nominally parallel to a plane of said spatial light modulator; and
   wherein said support element comprises a ring having gear teeth.

18. A housing for a spatial light modulator, wherein the spatial light modulator provides a modulated image beam, the housing comprising:
   (a) a first frame for supporting the spatial light modulator in a path of an incident illumination beam;
   (b) a second frame, fitted against said first frame, said second frame comprising:
      (i) an aperture for said incident illumination beam to said spatial light modulator and for said modulated image beam from said spatial light modulator;
      (ii) a support element for disposing an optical component proximate said aperture, said support element rotatable adjustable about an axis such that said optical component rotates in a plane nominally parallel to a plane of said spatial light modulator; and
   wherein said support element is rotatably adjustable by more than 90 degrees.

19. A light modulation subsystem in an imaging apparatus comprising:
   (a) an illumination source for providing an illumination beam to a polarizing beamsplitter, said polarizing beamsplitter forming a polarized illumination beam;
   (b) a spatial light modulator for modulating said polarized illumination beam to form a modulated image beam;
   (c) a housing for said spatial light modulator, the housing comprising:
      (i) a first frame for supporting said spatial light modulator in a path of said polarized illumination beam;
      (ii) a second frame, fitted against said first frame, said second frame comprising an aperture for said modulated image beam; and a support element for disposing an optical component proximate said aperture, said support element rotatably adjustable about an axis; and
   wherein said support element comprises a pinion gear.

20. A housing for a spatial light modulator according to claim 19 wherein said spatial light modulator is a transmissive LCD.

21. A housing for a spatial light modulator according to claim 19 wherein said spatial light modulator is a reflective LCD.

22. A housing for a spatial light modulator according to claim 19 wherein said optical component is a compensator.

23. A housing for a spatial light modulator according to claim 19 wherein said optical component is a polarizer.

24. A housing for a spatial light modulator according to claim 19 wherein said optical component is a filter.

25. A housing for a spatial light modulator according to claim 19 wherein said first frame further comprises a second aperture for said polarized illumination beam.

26. A light modulation subsystem in an imaging apparatus comprising:
   (a) an illumination source for providing an illumination beam to a polarizing beamsplitter, said polarizing beamsplitter forming a polarized illumination beam;
   (b) a spatial light modulator for modulating said polarized illumination beam to form a modulated image beam;
   (c) a housing for said spatial light modulator, the housing comprising:
      (i) a first frame for supporting said spatial light modulator in a path of said polarized illumination beam;
      (ii) a second frame, fitted against said first frame, said second frame comprising an aperture for said modulated image beam; and a support element for disposing an optical component proximate said aperture, said support element rotatably adjustable about an axis; and
   wherein said support element comprises a ring having gear teeth.

27. A light modulation subsystem in an imaging apparatus comprising:
   (a) an illumination source for providing an illumination beam to a polarizing beamsplitter, said polarizing beamsplitter forming a polarized illumination beam;
   (b) a spatial light modulator for modulating said polarized illumination beam to form a modulated image beam;
   (c) a housing for said spatial light modulator, the housing comprising:
      (i) a first frame for supporting said spatial light modulator in a path of said polarized illumination beam;
      (ii) a second frame, fitted against said first frame, said second frame comprising an aperture for said modulated image beam; and a support element for disposing an optical component proximate said aperture, said support element rotatably adjustable about an axis; and
   wherein said support element is rotatably adjustable by more than 90 degrees.

28. A light modulation subsystem in an imaging apparatus comprising:
   (a) an illumination source for providing an illumination beam to a polarizing beamsplitter, said polarizing beamsplitter forming a polarized illumination beam;
   (b) a spatial light modulator for modulating said polarized illumination beam to form a modulated image beam;
   (c) a housing for said spatial light modulator, the housing comprising:
      (i) a first frame for supporting said spatial light modulator in a path of said polarized illumination beam;
      (ii) a second frame, fitted against said first frame, said second frame comprising an aperture for said modulated image beam; and a support element for disposing an optical component proximate said aperture, said support element rotatably adjustable about an axis; and
   wherein said axis is an optical axis.

29. A method of mounting a spatial light modulator comprising:
   (a) supporting the spatial light modulator within a base frame, in a path of an incident illumination beam;
   (b) providing a cover frame comprising an aperture and supporting an optical component proximate said aperture within a support element, said support element rotatably adjustable about an axis;
   (c) mounting said cover frame against said base frame; and
   wherein the step of supporting an optical component proximate said aperture comprises the step of seating a compensator within a rotatable ring.

* * * * *